United States Patent [19]

Butterworth et al.

[11] 4,100,934

[45] Jul. 18, 1978

[54] RECIPROCATING REFRIGERANT COMPRESSOR VALVE ARRANGEMENT

[75] Inventors: Arthur L. Butterworth; Joseph F. Niedzwiecki, both of La Crosse, Wis.

[73] Assignee: The Trane Company, La Crosse, Wis.

[21] Appl. No.: 797,155

[22] Filed: May 16, 1977

[51] Int. Cl.[2] .................. F16K 15/14; F16K 51/00
[52] U.S. Cl. .......................... 137/512; 137/516.15; 137/454.4; 251/361; 417/571
[58] Field of Search ............. 137/512, 516.15, 454.2, 137/454.4, 454.6, 856, 860; 251/361; 417/559, 564, 560, 569, 570, 571

[56] References Cited

U.S. PATENT DOCUMENTS

| 2,613,870 | 10/1952 | Borgerd | 137/512 |
| 2,948,461 | 9/1960 | Frank | 417/564 |
| 3,648,722 | 3/1972 | Story et al. | 137/454.2 X |
| 3,830,253 | 8/1974 | Speich et al. | 137/860 |
| 4,027,853 | 6/1977 | Linnert | 137/454.4 |

FOREIGN PATENT DOCUMENTS 1,063,206  12/1953  France ............................ 137/516.15

Primary Examiner—William R. Cline
Attorney, Agent, or Firm—Carl M. Lewis

[57] ABSTRACT

An annular valve stop insert for a compressor body is shown which has the function of establishing the positional relationship of the valve plate, valve and compressor body.

18 Claims, 6 Drawing Figures

RECIPROCATING REFRIGERANT COMPRESSOR VALVE ARRANGEMENT

BACKGROUND OF THE INVENTION

The present state of the art displays a variety of arrangements for mounting discharge and suction valves for reciprocating refrigerant compressors. The valves may be mounted in the compressor body by way of a separate valve plate which serves the function of defining the valve seat as will be seen in U.S. Pat. No. 3,472,446. In this patent vertical slots disposed within the cylinder wall cooperate with the tabs on the suction valve to function as a valve stop. Pins are used to align the valve plate, compressor body and valve.

U.S. Pat. No. 3,830,253 shows another arrangement wherein the suction valve seat is formed by the cylinder liner. The cylinder liner and valve stop cage are positioned laterally relative to each other by the walls of the bore within which they are disposed. The valve stop cage serves the purpose of restraining the suction valve in its fully open position.

BACKGROUND OF THE INVENTION

The valve stop of the instant invention provides additional functions that are not present in the prior art. The valve stop of the instant invention is in the form of an annular insert disposed within a counterbore at the top of the cylinder. It has an upwardly protruding annular flange which serves not only to locate the suction valve with respect to lateral movement, but it further serves to locate the compressor valve plate with respect to the compressor cylinder body. Furthermore, the insert is provided with a pair of recesses at the bottom inner edge thereof which serve to permit easy removal of the insert from the cylinder body. These recesses are located circumferentially with respect to the contour of the valve stop surface so as to maintain the strength of the valve stop insert.

Thus it will be seen that it is an object of this invention to provide a valve stop insert which serves to locate a compressor valve with respect to lateral movement.

It is a further object of this invention to provide a valve stop insert which serves to locate a compressor valve plate with respect to a compressor cylinder body.

And it is still a further object of this invention to provide a valve stop insert which is provided with means for easy removal without substantially affecting the strength of the valve stop insert.

Specifically, this invention involves in a compressor apparatus the combination of: a cylinder body having a generally planar face and a cylinder defined therein and opening at one end thereof to said generally planar face; a valve plate overlying said face and having inlet and discharge passageways therein for conveying a compressible fluid to and from said cylinder, said valve plate including an annular valve seat adjacent said face at one end of said one of said passageways; an annular valve disposed on the bottom side of said valve plate and in face-to-face abutting relationship with said valve seat; a valve stop in said cylinder body below said valve plate for limiting the axial movement of said valve in its open position; said valve stop including a flange extending upwardly beyond said face; and said valve plate having a recess at said valve seat receiving said flange.

This invention further involves in a compressor apparatus the combination of: a cylinder body having a generally planar first face and a cylinder defined therein and opening at one end thereof to said generally planar first face; a valve plate overlying said first face and having a generally planar second face disposed in face-to-face relation with said first face; an inlet passageway in one of said cylinder body and said valve plate for delivering a compressible fluid to said cylinder and having an opening in one of said first and second faces; an annular valve disposed between said valve plate and said cylinder body positioned to close the opening of said inlet passageway at said one face; an annular valve stop insert disposed in the other of said valve plate and cylinder body for limiting the axial movement of said valve in its open position; said valve stop having an axially extending flange for limiting the lateral movement of said valve and extending beyond both of said first and second faces; said one of said valve plate and cylinder body having a recess for receiving said flange.

DESCRIPTION OF THE DRAWINGS

These and other objects of the invention will become more apparent as this specification proceeds to describe the invention with reference to the drawing in which.

DETAILED DESCRIPTION

Figure 1:
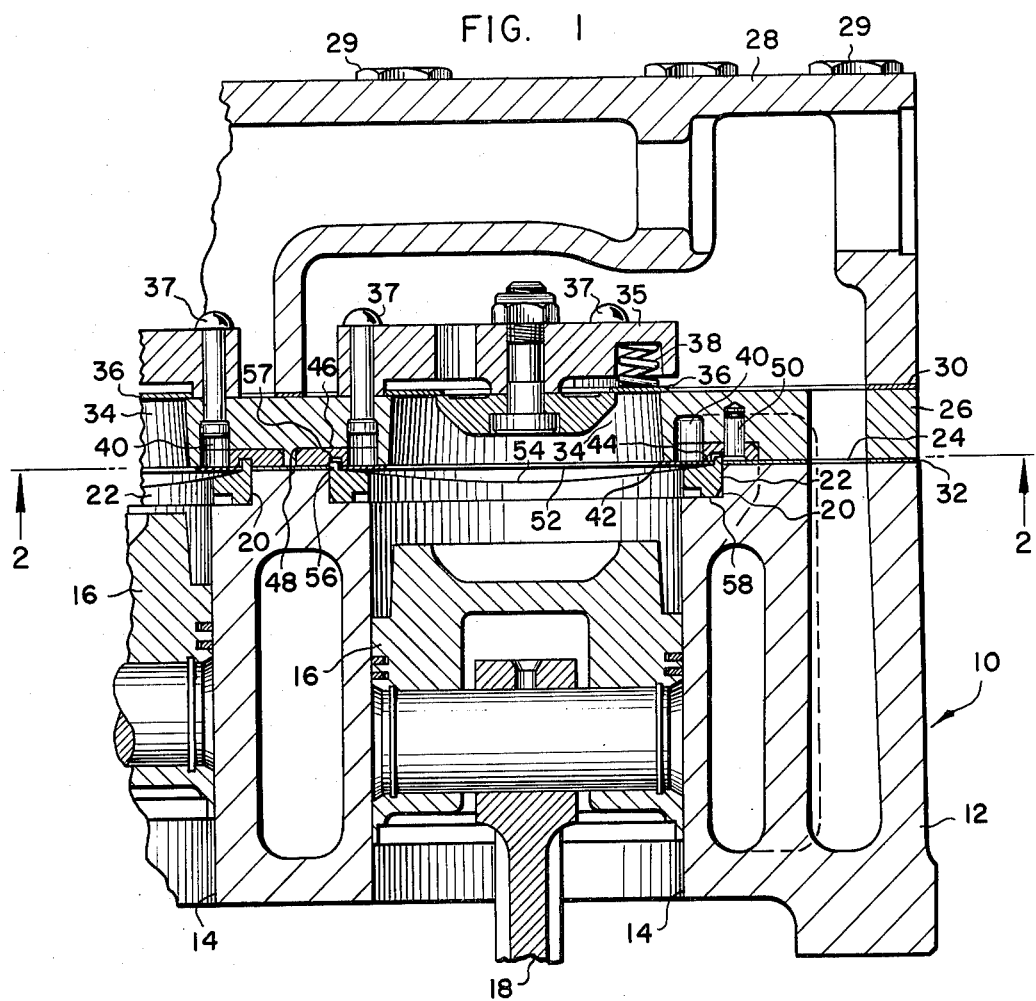
FIG. 1 is a vertical section of a portion of a reciprocating compressor incorporating the invention taken along a plane passing through the axis of a cylinder thereof.
Figure 2:
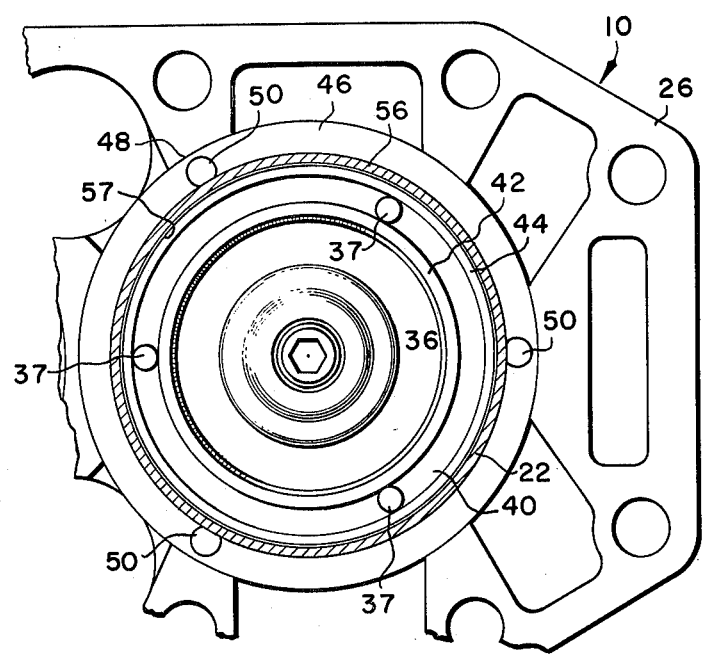
FIG. 2 is a sectional view looking upward along a plane designated by line 2—2 of FIG. 1.
Figure 5:
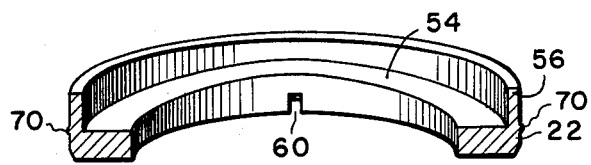
FIG. 5 is a sectional view of the valve stop insert taken along line 5—5 of FIG. 3 and viewed slightly from above.
Figure 4:
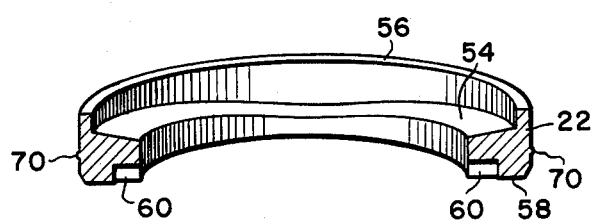
FIG. 4 is a sectional view of the valve stop insert taken at line 4—4 of FIG. 3 viewed slightly from above.
Figure 3:
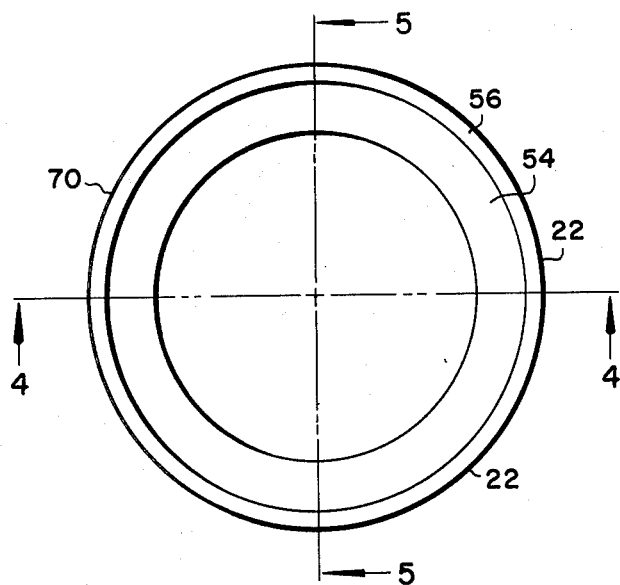
FIG. 3 is a top view of the annular valve stop insert shown in FIGS. 1 and 2.
Figure 6:
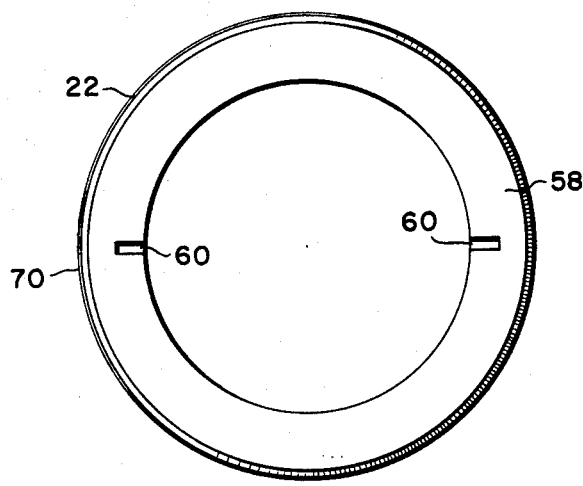
FIG. 6 is a bottom view of the annular valve stop insert.

Reciprocating refrigerant compressor apparatus 10 has a cylinder body 12 provided with bores to define cylinders 14. A piston 16 is slideably mounted within cylinder 14 for reciprocal movement upon being driven by connecting rod 18 which is connected to a conventional crankshaft (not shown). There is an enlarged portion or counterbore 20 at the upper end of cylinder 14 for receiving annular valve stop insert 22. The upper face 24 of cylinder body 12 is substantially planar.

Overlying the cylinders 14 is valve plate 26 over which lies compressor head 28. Both the upper and lower surfaces of valve plate 26 and the lower surface of compressor head 28 are substantially planar. Preferably a first gasket 30 is interposed between valve plate 26 and compressor head 28 and a second gasket 32 is interposed between valve plate 26 and cylinder body 12. Head 28 is secured by bolts 29.

Valve plate 26 is provided with a large discharge passageway 34 communicating with cylinder 14. A ring-plate discharge valve 36 biased to the closed position via springs 38 closes passageway 34 except when compressed refrigerant is being discharged from cylinder 14. The valve 36 and springs are retained in position by valve cage 35 connected to valve plate 26 by rivits 37.

Valve plate 26 also includes an annular inlet passageway 40 which has at the outlet thereof an annular radially inner seat 42 and an annular radially outer seat 44.

The outer seat 44 is defined by an annular seat insert 46 retained within an annular recess 48 on the lower side of valve plate 26 by stud rivits 50.

The opening between passageway 40 and cylinder 14 is normally closed by resilient annular circular flexible valve member 52 which bridges between annular seat 42 and annular seat 44. Refrigerant gas is admitted to the cylinder 14 from the passageway 40 during downward movement of piston 16. During this period valve 52 flexes toward the upper cylindrical face 54 of annular valve stop insert 22. Excessive flexing of the valve is prevented by valve contact with surface 54. A narrow annular recess 57 is provided in the lower surface of valve plate insert 46 for purposes of which will become evident from a more detailed description of annular valve stop insert 22 as is more fully disclosed in FIGS. 3 – 6.

Valve stop insert 22 is preferably formed by molding metal powder to achieve the complex contours. Surface 54, against which valve 52 abuts in the extreme open position, conforms to the surface of a right circular cylinder having an axis disposed above valve 52 and extending normal to the viewing plane of FIG. 1. Extending upwardly at the radially outer edge of surface 54 is an annular flange 56. It will be evident from FIG. 1 that flange 56 serves to restrain valve 52 against lateral movement in a direction normal to the axis of cylinder 14, while permitting valve 52 to flex from the position shown in FIG. 1 to a position abutting cylindrical surface 54.

It will also be noted from FIG. 1 that flange 56 extends upwardly beyond valve 52 and beyond gasket 32 into the valve plate circular recess 57 thereby locating valve plate 26 with respect to valve stop insert 22. This is an important feature of the invention. Since the valve 52 is located by the valve stop insert 22, it is important to proper valve performance that the valve be properly located with respect to valve seats 42 and 44 carried by valve plate 26. Flange 56 and recess 57 serve to provide this precise locating function. Thus it will be seen that flange 56 serves the purpose of restraining annular valve 52, locating the stop insert 22 with respect to valve plate 26, and thus locating annular valve 52 with respect to valve seats 42 and 44.

Located at the thickest cross-section between cylindrical surface 54 and bottom surface 58 of valve stop 22 is a pair of radially directed grooves or slots 60. Slots 60 are provided to receive a portion of a valve stop extraction tool for removing the valve stop insert from the enlarged portion 20 of cylinder 14. Slots 60 are located in the thickest cross-section as will be viewed in FIG. 4 so as not to unnecessarily weaken the valve stop insert.

Another feature of the annular valve stop 22 is the provision of an annular shear ridge or protrusion 70 which prior to insertion into counterbore 20 extends radially outwardly a distance of over 1 mil. In order to provide a secure fit of the powdered metal valve stop 22 within counterbore 20 without the use of high forces which might distort the powdered metal, we first proposed to grind the radially outer surface of insert 22. However, experiments demonstrated that such grinding introduced a non-concentricity which resulted in valve binding. The need for such grinding has been eliminated by the addition of shear ridge 70. The ridge is relatively narrow to permit it to be sheared without high forces as the valve stop is inserted in counterbore 70. The remaining portion of the ridge becomes pressed-in-place to secure the valve stop in position. The ridge is located about one-third the axial length of the valve stop 22 from the end thereof facing the cylinder body.

Having now described the preferred embodiment of our reciprocating refrigerant compressor valve arrangement, it is anticipated that there are many changes that may be made without departing from the scope and spirit of our invention and we accordingly desire to be limited only by the claims.

We claim:

1. In a compressor apparatus the combination of: a cylinder body having a generally planar face and a cylinder defined in said cylinder body opening at one end thereof to said generally planar face, a valve plate overlying said face and having inlet and discharge passageways therein for conveying a compressible fluid to and from said cylinder, said valve plate including an annular valve seat at one end of one of said passageways; an annular valve disposed in face-to-face abutting relationship with said valve seat; a valve stop in said cylinder body below said valve plate for limiting the axial movement of said valve in its open position; said valve stop including a flange extending upwardly beyond said face; said valve plate having a recess at said valve seat receiving said flange.

2. The apparatus as defined by claim 1 wherein said flange is positioned to contact the periphery of said annular valve to thereby limit lateral movement of said valve.

3. The apparatus as defined by claim 1 wherein said recess is annular and receives said flange along an annular locus.

4. The apparatus as defined by claim 1 wherein said valve stop is an annular insert disposed within an enlarged portion of said cylinder adjacent said planar face.

5. The apparatus as defined by claim 4 wherein said insert has at least two grooves therein opening radially inwardly thereof for receiving an extraction tool for removal of said valve stop insert.

6. The apparatus as defined by claim 5 wherein said valve stop insert includes: a bottom face disposed to face said compressor body; an upper substantially annular face curved to a substantially cylindrical contour and disposed in face-to-face relationship with one face of said annular valve, whereby the thickness between said upper face and said lower face varies between two areas of greater thickness and two areas of lesser thickness; and wherein each area of greater thickness is provided with one of said grooves.

7. The apparatus as defined by claim 4 wherein said annular insert is powdered metal and includes a shear ridge protruding radially outwardly therefrom, the outer edge of said ridge being limited in extent by having been sheared upon insertion of said valve stop insert into said enlarged portion of said cylinder.

8. The apparatus as defined by claim 7 wherein said ridge is disposed upon an annular locus located about one-third the axial length of said annular insert from the axial end thereof extending toward said cylinder body.

9. The apparatus as defined by claim 8 wherein the axial extent of said flange varies along said annular extent between two maximum and two minimum values.

10. The apparatus as defined by claim 9 wherein said flange and recess are circular.

11. The apparatus of claim 1 wherein said flange is annular.

12. The apparatus as defined by claim 11 including a second annular insert disposed within said one of said valve plate and cylinder body and defining at least a portion of a valve seat positioned in face-to-face relation with said valve; said second insert being provided with said recess for receiving said flange.

13. The apparatus as defined by claim 11 wherein said valve stop includes a curved surface disposed radially inwardly of said flange in face-to-face relation with said annular valve which surface has a contour substantially corresponding to a right circular cylinder.

14. The apparatus as defined by claim 13 wherein the axial extent of said flange varies along said annular extent between two maximum and two minimum values.

15. The apparatus as defined by claim 11 wherein said recess is annular and receives said flange along an annular locus.

16. The appartus as defined by claim 11 wherein said flange is annular.

17. In compressor apparatus the combination of: a cylinder body having a generally planar first face and a cylinder defined in said cylinder body opening at one end thereof to said generally planar first face; a valve plate overlying said first face and having a generally planar second face disposed in face-to-face relation with said first face; an inlet passageway in one of said cylinder body and said valve plate for delivering a compressible fluid to said cylinder and having an opening in one of said first and second faces; an annular valve disposed between said valve plate and said cylinder body and positioned to close the opening of said inlet passageway at said one face; a valve stop insert disposed in the other of said valve plate and cylinder body for limiting the axial movement of said valve in its open position; said valve stop having an axially extending flange for limiting the lateral movement of said annular valve and extending axially beyond both of said first and second faces; said one of said valve plate and cylinder body having a recess for receiving said flange.

18. In a compressor apparatus the combination of: a cylinder body having an upper first face and a plurality of cylinders in said cylinder body each opening at one end thereof to said upper first face; a valve plate having a lower second face abutting said upper first face, and overlying said plurality of cylinders and having discharge passageways therein for conveying a compressible fluid from said cylinders; a discharge valve in each of said discharge passageways; an inlet passageway in one of said cylinder body and said valve plate for delivering a compressible fluid to one of said cylinders and having an opening in one of said first and second faces; an annular inlet valve disposed between said valve plate and said cylinder body positioned to close the opening of said inlet passageway at said one face; a valve stop insert disposed within the other of said valve plate and cylinder body between said valve plate and cylinder body for limiting the axial movement of said annular inlet valve in its open position along a contoured substantially annular locus about said one cylinder.

* * * * *